United States Patent [19]

Gambetti

[11] Patent Number: 4,646,908
[45] Date of Patent: Mar. 3, 1987

[54] APPARATUS FOR STACKING PACKAGES IN PARTICULAR FOR WRAPPING INSTALLATIONS USING A STRIP OF HEAT-SHRINKABLE MATERIAL

[75] Inventor: Mario Gambetti, Crevalcore, Italy

[73] Assignee: Baumer di Mario Gambetti, Castelfranco Emilia, Italy

[21] Appl. No.: 749,871

[22] Filed: Jun. 27, 1985

[30] Foreign Application Priority Data

Aug. 14, 1984 [IT] Italy ................................ 40078 A/84

[51] Int. Cl.⁴ ........................................... B65G 57/00
[52] U.S. Cl. ..................................... 198/422; 414/29; 53/540
[58] Field of Search .................. 198/422, 374; 414/29, 414/55; 53/540

[56] References Cited

U.S. PATENT DOCUMENTS 2,919,821  1/1960  Young ................................ 198/422
4,450,949  5/1984  Buschor et al. ..................... 198/422

Primary Examiner—Joseph E. Valenza
Attorney, Agent, or Firm—Karl F. Ross; Herbert Dubno

[57] ABSTRACT

A plant for wrapping products has a packaging machine for packaging groups of products in single packages and a machine for wrapping these packages with a strip of heat-shrinkable material. An apparatus for stacking these single packages to be wrapped is disposed between these machines and comprises a first horizontal conveyor and pair of conveyors adjacent and parallel to the opposite sides of this first conveyor. Each conveyor of the pair is formed by a plurality of conveyor units with their respective upper branches or stretches at different levels and each provided with uniformly spaced lifters disposed opposite one another in a symmetrical manner. These conveyor units have a continuous movement, to maintain the lifting means symmetrically opposite one another in a constant vertical position and the lifters are caused to oscillate about a respective horizontal axis for the takeup and discharge of the single packages being stacked.

4 Claims, 9 Drawing Figures

APPARATUS FOR STACKING PACKAGES IN PARTICULAR FOR WRAPPING INSTALLATIONS USING A STRIP OF HEAT-SHRINKABLE MATERIAL

FIELD OF THE INVENTION

The present invention relates to an apparatus for stacking packages, particularly for use in wrapping installations using a strip of heat-shrinkable material. More particularly, the invention relates to an apparatus designed to be located between a packaging machine for packaging groups of products in single packages and a machine for wrapping these packages using a strip of heat-shrinkable material.

BACKGROUND OF THE INVENTION

A packaging machine may be a boxing machine designed to package individual groups of products in boxes or a packaging machine designed to wrap the individual groups of products using a strip of heat-shrinkable material after arranging these products in groups on a support element which may be prefabricated, for example in the form of a tray.

A wrapping machine associated with the packaging machine, can be a machine of conventional type for wrapping packages with a strip of heat-shrinkable material.

SUMMARY OF THE INVENTION

In accordance with the present invention, a plant for wrapping products can have a packaging machine in particular for packaging groups of products in individual packages and a machine for wrapping these packages with a strip of heat-shrinkable material, in which these machines are of the type comprising closed circuit horizontal conveyors which are preferably coplanar. An apparatus is provided for stacking these individual packages to be wrapped disposed with no gap between these machines. The apparatus comprises a first horizontal closed circuit conveyor coplanar with the conveyors of the above-mentioned machines and a pair of closed circuit longitudinal conveyors which are parallel and adjacent externally to the opposite sides of this first horizontal conveyor, each conveyor of the pair of conveyors being formed by one or more pairs of closed circuit conveyor means adjacent respectively to the upper branch of each pair of conveyor means at different levels in planes which are higher and superimposed on the plane of the first horizontal conveyor, the conveyor means of each pair of conveyors being associated in a uniformly spaced longitudinal arrangement with a respective plurality of lifting means disposed facing one another symmetrically for each pair of conveyor means, actuation means being provided for actuating the conveyor means with a continuous movement, for maintaining the symmetrically opposite lifting means in a constant vertical position and for causing the lifting means to oscillate about a fixed horizontal axis parallel to the direction of movement of the conveyor means for the take-up and discharge of the individual packages being stacked.

BRIEF DESCRIPTION OF THE DRAWING

Further features and advantages of the apparatus of the invention are disclosed in the following detailed description of a preferred practical embodiment with reference to the accompanying drawing, in which.

SPECIFIC DESCRIPTION

Figure 1:
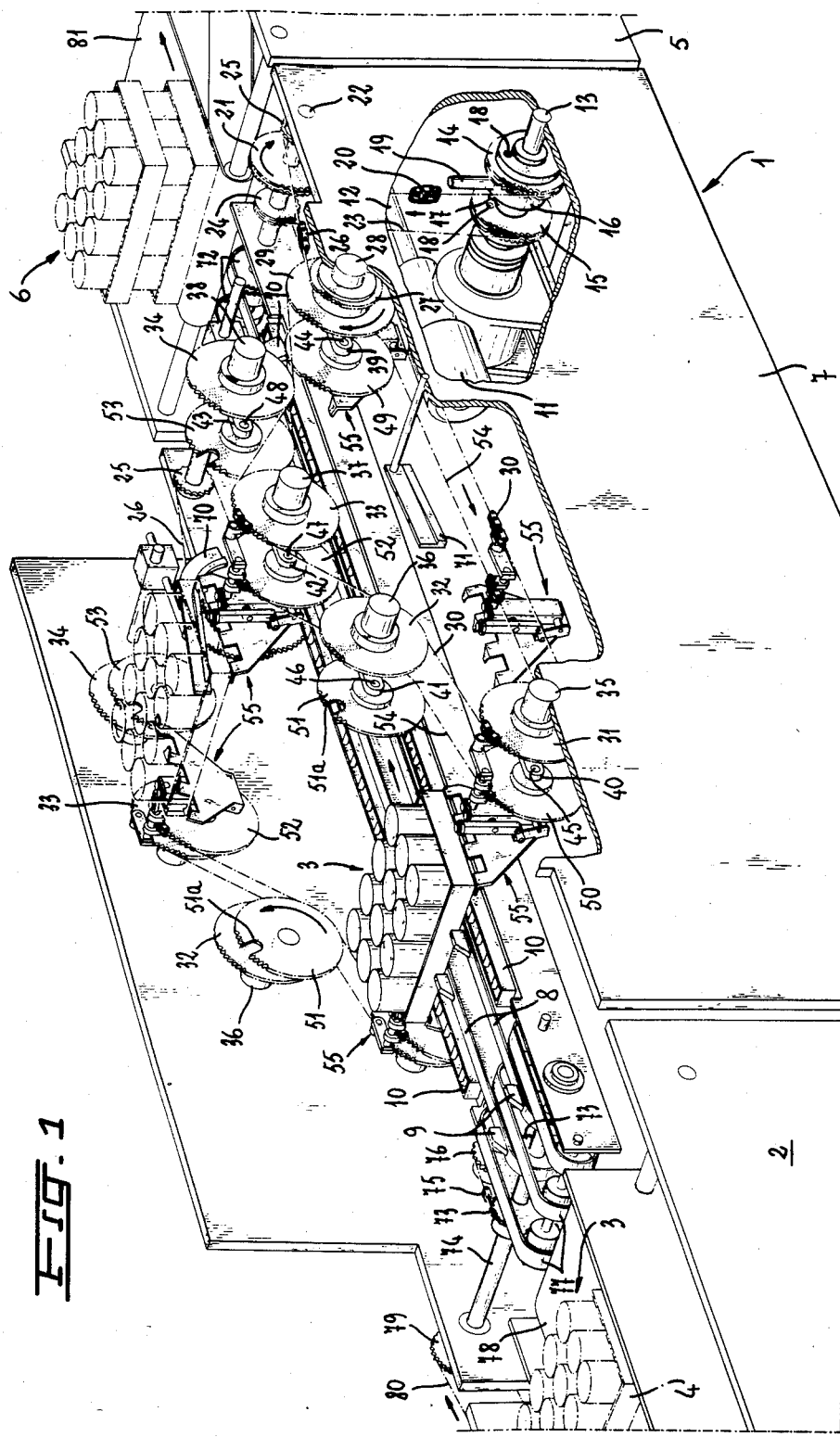
FIG. 1 is a diagrammatic perspective view, in frontal and lateral cross-section of the apparatus of the invention installed in a wrapping plant.

As mentioned above, the apparatus 1 of the invention is inserted (see FIG. 1) in a wrapping plant comprising a packaging machine 2, particularly for packaging groups of products in single packages 3, for example of the type in which these products are disposed on a support element shaped as a tray 4, and a machine 5 for wrapping these packages 3 by means of a strip of heat-shrinkable material.

For the sake of simplicity and brevity, in the case of machines 2 and 5 only the respective end portions, the downstream portion of the packaging machine 2 and the upstream portion of the wrapping machine 5, involved directly with the apparatus 1 of the invention which is, as mentioned above, disposed without a gap between the two machines 2 and 5, are shown.

In the case illustrated in the attached drawings, these two machines are of the type having closed circuit horizontal conveyors which are coplanar for supplying the packages 3 to be stacked to the stacking apparatus 1 of the invention and for receiving stacks 6 of these packages 3 formed in this intermediate apparatus 1, as will be explained below, to be wrapped with a heat-shrinkable strip by the wrapping machine 5.

The apparatus 1 is provided for the formation of stacks 6 of packages of products formed by two single packages 3 and comprises a support base 7 for a flat conveyor coplanar with the horizontal conveyors of the packaging machine 2 upstream of the wrapping machine 5 which is downstream. This flat conveyor is formed by two closed circuit longitudinal parallel conveyors 8 of the so-called tracked type with thrust lugs 9 and by two sliding support wheel guides 10 disposed parallel and externally adjacent to the tracked conveyors 8.

A single motor reducing unit 11 is provided with a rapid output shaft 12 for driving the wrapping machine 5 and a slow output shaft 13 for driving the stacking apparatus 1 of the invention and the packaging machine 2.

This slow output shaft 13 has mounted on it in a free manner two sprocket wheels 14 and 15 and between these two wheels there is keyed slidably on the shaft 13 a sleeve 16 having opposite engagement pins 17 designed to cause the rotation, by means of their insertion in corresponding holes 18, of one or other of the chain wheels 14 and 15 following the axial displacement of the sleeve 16 via a manually actuated control lever 19.

On the chain wheel 14 there is wound a transmission chain 20 which is also wound on a chain wheel 21 keyed on a horizontal shaft 22 supported transversely in a rotary manner by the longitudinal lateral shoulders of the base 7 of the apparatus 1 while on the chain wheel 15 there is wound a transmission chain 23 also wound on a second chain wheel 24 keyed on the horizontal shaft 22 as well.

The diameter of the two sprocket wheels 21 and 24 is selected in relation to the direct passage of the packages 3 from the packaging machine 2 to the wrapping machine 5 via the apparatus 1 of the invention without the packages 3 being stacked and in relation to the number of packages 3 per stack it is desired to obtain with the apparatus 1. In the case of the stacking apparatus shown, as mentioned above, the stacks obtained comprise two packages 3.

On the horizontal shaft 22 there is also keyed, in the vicinity of the front lateral shoulder in FIG. 1 of the base 7 which supports it a third sprocket wheel 25 designed to transmit the movement to the stacking members of the apparatus 1 which will now be described in detail. About this third sprocket wheel 25 there is wound a transmission sprocket 26 also wound about a chain wheel 27 keyed on a horizontal shaft 28 supported freely in a transverse manner and detachable towards the interior of the apparatus 1 from the front longitudinal and lateral shoulder of the base 7. On this shaft 28 there is keyed a further sprocket wheel 29 on which there is wound a chain 30 also wound on sprocket wheels 31, 32, 33, 34 such that its upper branch is disposed at a higher level than the above-mentioned flat conveyor formed by the the tracked conveyors 8 and the sliding support wheel guides 10. These sprocket wheels 31, 32, 33, and 34 are freely mounted on respective shafts 35, 36, 37 and 38 supported horizontally in a detachable manner in the direction of the interior of the apparatus of the front shoulder of the base 7 in a similar manner to the shaft 28. On these shafts 28, 35, 36, 37 and 38 there is fixed one end of a corresponding arm 39, 40, 41, 42 and 43 to whose other end there is fixed in a detachable manner a horizontal pin 44, 45, 46, 47, 48 facing the interior of the apparatus 1 and on which there is freely mounted a corresponding sprocket wheel 49, 50, 51, 52, 53. A chain 54 is wound about these sprocket wheels 49, 50, 51, 52, 53 so as to run parallel to the chain 30 wound about the sprocket wheels 29, 31, 32, 33, 34. The sprocket wheels 49, 50, 51, 52, 53 are provided on their periphery with a plurality of notches designated by the same reference numerals as the wheels with the addition of the index a. The object of these notches will be described in the description of the operation of the apparatus 1.

Four lifting devices or means 55 are supported by the chains 30 and 54.

Figure 2:
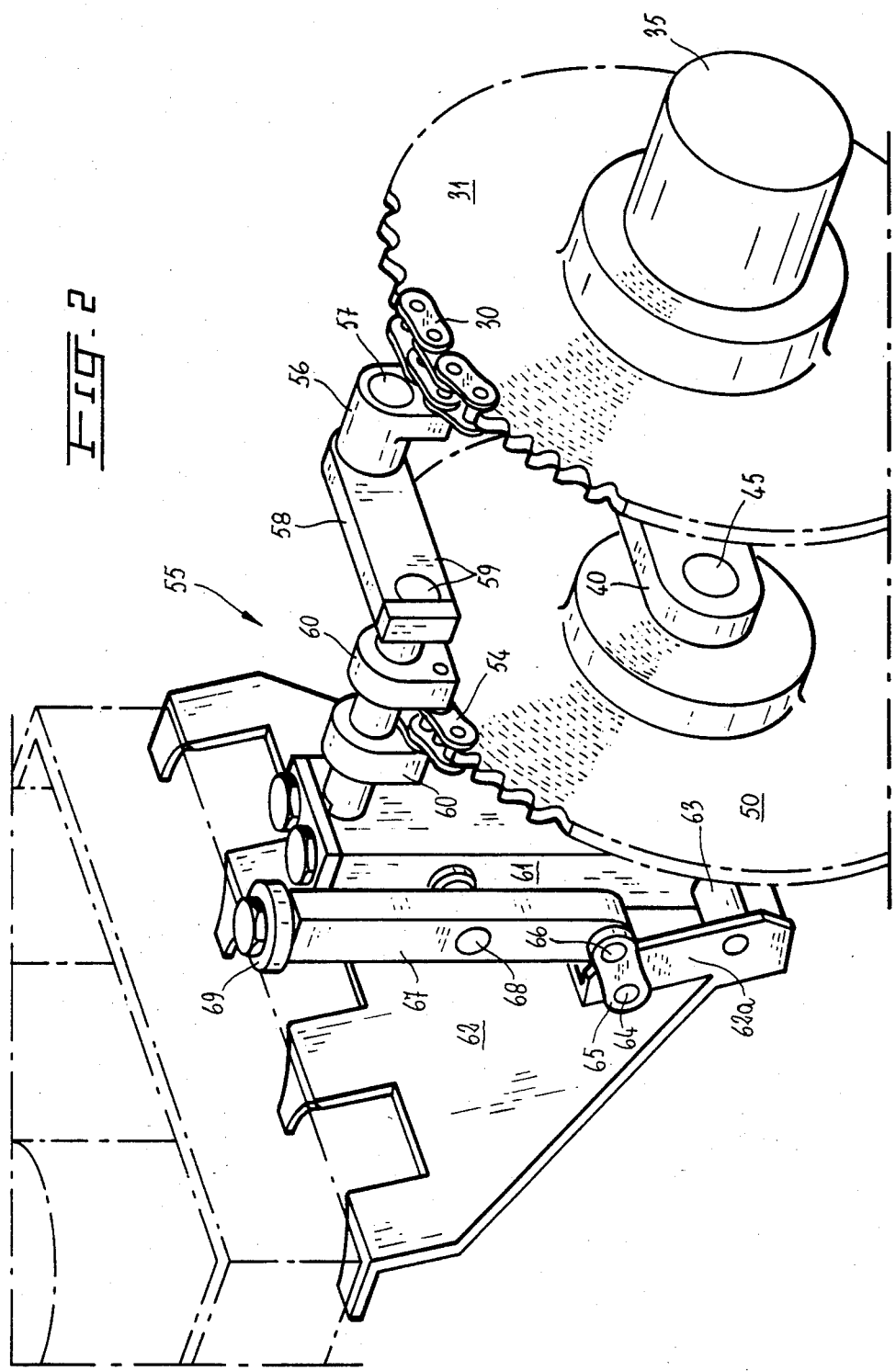
FIG. 2 is a perspective view, on an enlarged scale, of a detail of this apparatus.

Each of these lifting devices comprises (see FIG. 2 in particular), a block 56 fixed to the chain 30 and provided with a pin 57 on which one end of an arm 58 is freely and rotatably mounted, the other end of this arm being fixed to the end of a spindle 59 extending horizontally in a detachable manner towards the interior of the apparatus 1. This spindle 59 passes in a rotary manner via two blocks 60 fixed to the opposite sides of the chain 54 and at its other end it supports in a rigid manner a support element 61 extending vertically downwardly. A plate-like lifting element 62 terminating at the top in the form of hoe with the profile of a rake is rotatably articulated on the lower end of the support element 61 by means of a horizontal pin 63. This lifting element 62 is provided at its end articulated at 63 with a lever arm 62a on whose free end there is articulated at 64 the end of a connecting rod 65 whose other end is articulated at 66 on the end of a lever 67 pivoted at an intermediate point 68 on the support element 61 and having at its other end a cam follower roller 69 rotating freely about a vertical axis designed to act on, as will be explained below, cam elements 70 and 71 disposed (see FIG. 1) along the upper and lower paths of the chain 54.

A conveyor and lifting system similar to the system described above and substantially formed by the chain wheels 31, 32, 33 and 34 with the chain 30 and by the chain wheels 51, 52 and 53 with the chain 54 and its associated lifting devices 55 is provided symmetrically with respect to the latter and consequently its components are indicated with the same reference numerals as the components of the system described in detail. It is also driven in a symmetrical manner via a corresponding chain wheel 25 and chain 26.

The drive of the tracked conveyors 8 is carried out by toothed wheels 72 keyed on the motor-driven shaft 22 and toothed wheels 73 keyed on a shaft 74. On one of these toothed wheels 73 there is wound a chain 75 also wound about a sprocket wheel 76 for the drive of a tracked conveyor 77 disposed centrally between the conveyor means 8 of the stacking apparatus and the packaging machine 2, whose output conveyor 78 is driven via a sprocket wheel 79 keyed on the shaft 74 and the chain 80. The conveyor 81 of the wrapping machine 5 is, as mentioned above, driven by the rapid shaft 12 of the gear reduction unit 11.

Figure 3:
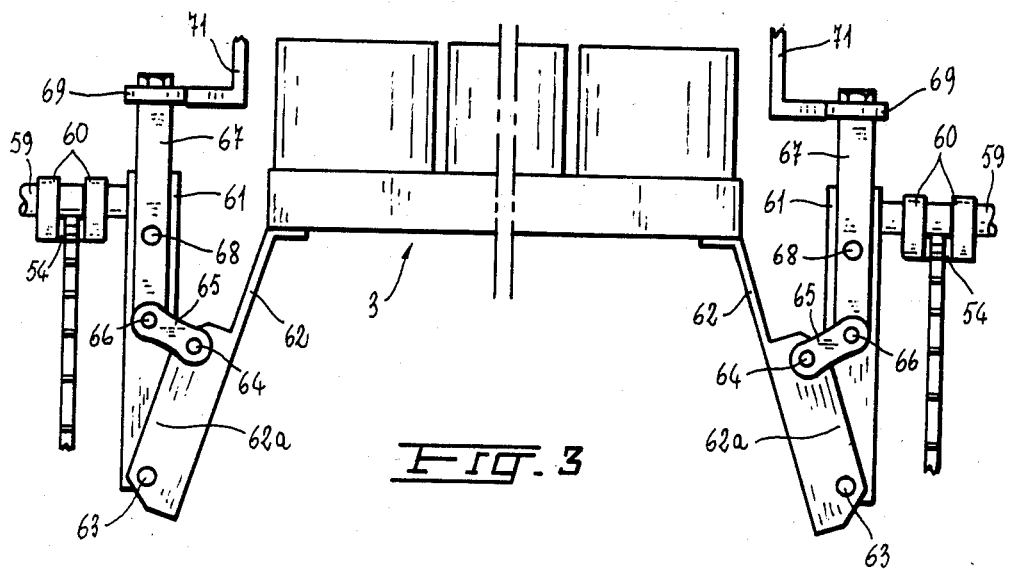
FIGS. 3 and 4 are top views of details of FIG. 2 in two operational positions.
Figure 4:
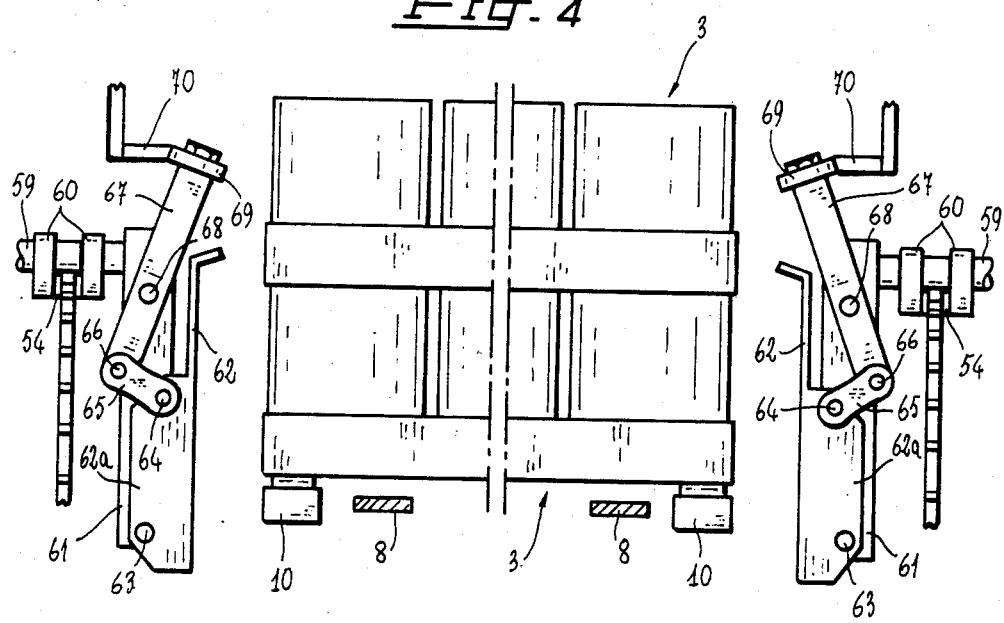
Figure 5:
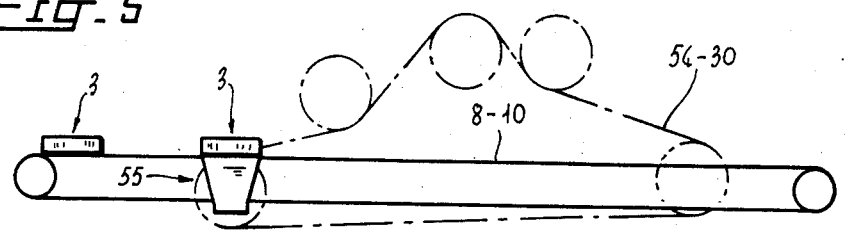
FIGS. 5 to 9 show a sequence of operational positions of the stacking members of the apparatus of the invention.
Figure 6:
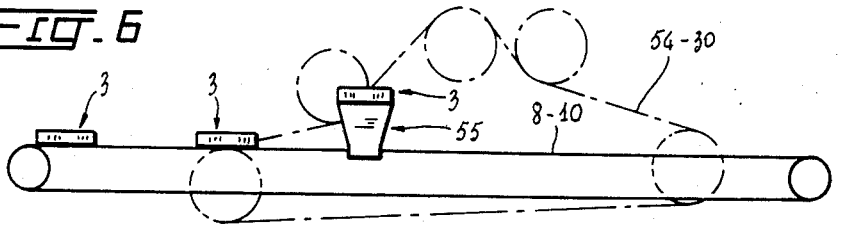
Figure 7:
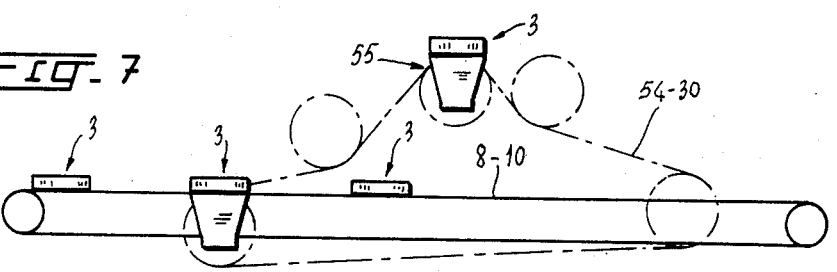
Figure 8:
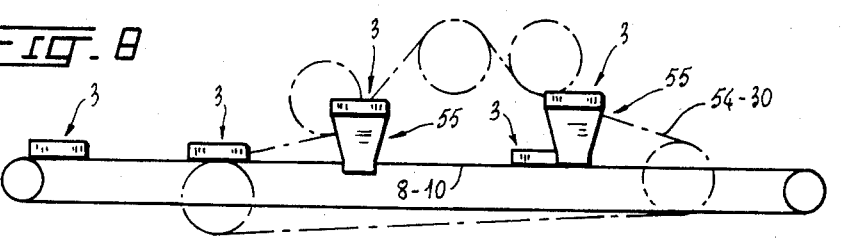
Figure 9:
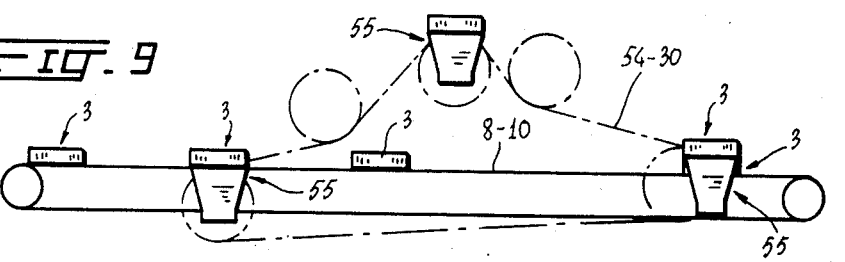

The plant and the stacking apparatus of the invention operate as follows:

The packages 3 are supplied in individual sequence on the output conveyor 78 of the packaging machine 2 and by the conveyor 78 to the intermediate conveyor 73 at which point they are taken up in an alternating manner by the lugs 9 of the conveyors 8 and by the lifting devices 55. The package taken up by the symmetrical lifting devices 55 is lifted along the path defined by the upper branch of the parallel chains 30 and 54 and kept horizontal as a result of the joint between the pin 57 and the lug 56 fixed to the chain 30, and then deposited on the previous package which has meanwhile moved downstream and below the latter on the conveyor means 8 and 9 following the opening of the symmetrical lifting devices 55 via the cam elements 70 on which the idler rollers 69 act (see FIG. 4). These lifting devices 55 close again (see FIG. 3) during the return movement as a result of the cam elements 71. The stack of packages 6 obtained in this way is then supplied to the conveyor 81 of the wrapping machine 5 which is designed to wrap them with a strip of heat-shrinkable material in accordance with a known method.

FIGS. 5 to 9 show in diagram form five stages of the stacking of the packages 3 using the apparatus 1 of the invention.

The description of the stacking apparatus of the invention made with reference to the attached drawings is obviously only given by way of non-limiting example and it is therefore evident that any modifications or variants suggested in practice or by its use or embodiment may be made thereto, in cases in which individual packages reach its input and are discharged in stacks for wrapping, provided that these modifications and variants do not depart from the scope of the following claims.

I claim:

1. A stacking apparatus for receiving successive packages to be stacked from a packaging-machine conveyor and delivering stacks of said packages to a wrapping-machine conveyor, said stacking apparatus comprising:

a first closed-loop conveyor extending between said packaging-machine conveyor and said wrapping-machine conveyor having a generally straight upper stretch defining a first path receiving successive packages to be stacked from said packaging-machine conveyor at an upstream end and delivering said stacks of said packages to said wrapping-machine conveyor at a downstream end;

a second closed-loop conveyor having an upper portion overlying said upper stretch and rising from an upstream portion of said first path to lift packages above packages traveling along said first path and descending toward a downstream portion of said first path to lower and deposit each lifted package upon a package traveling along said first path to form a respective stack, said second closed-loop conveying including:

a respective pair of chains extending in closed loops along each side of said first path, at least one pickup device on each pair of chains engageable with a respective package at said upstream portion and releasing an engaged package at said downstream portion, said pickup devices each including a respective support positioned to remain substantially vertical as said supports are entrained by said chains along closed second paths, and respective arms mounted on said supports for pivotal movement about respective generally horizontal axes to engage and release said packages selectively, a pivot pin upon which each support is swingably mounted and pivotally carried by one chain of the respective pair and of an orientation controlled by the chains of the respective pair so that each support remains substantially vertical as said supports are entrained by said chains along said closed second paths, and cam follower means on each support, operatively coupled with the respective arm for displacing same about said respective generally horizontal axes; and fixed cam means at selected locations along the second paths of said pairs of chains for actuating said cam follower means.

2. The stacking apparatus defined in claim 1, further comprising a chain drive connected to both of said closed-loop conveyors for synchronously driving same.

3. The stacking apparatus defined in claim 1 wherein each of said cam follower means comprises a lever pivotally mounted on the respective support and provided at an upper end with a cam-follower roller engageable with said fixed cam means and connected by a link pivotally with the respective arm.

4. The stacking apparatus defined in claim 3 wherein said pivot pin is mounted to rotate in at least one block carried by an inner chain of the respective pair, said pin being connected with an orienting arm formed at an end thereof with a further pin journaled in another block of an outer chain of the respective pair.

* * * * *